(12) United States Patent
Vasiliev et al.

(10) Patent No.: US 10,294,415 B2
(45) Date of Patent: May 21, 2019

(54) ELECTROCHROMIC COMPOSITION AND ELECTROCHROMIC DEVICE USING SAME

(71) Applicant: IGLASS TECHNOLOGY LLC, Lewes, DE (US)

(72) Inventors: Evgeniy Vladimirovich Vasiliev, Novosibirsk (RU); Sergey Olegovich Borisov, Novosibirsk (RU); Pavel Anatolievich Zaikin, Novosibirsk (RU); Nikita Valerievich Kruglikov, Novosibirsk (RU)

(73) Assignee: iGlass Technology, Inc., Irvine, CA (US)

( * ) Notice: Subject to any disclaimer, the term of this patent is extended or adjusted under 35 U.S.C. 154(b) by 0 days.

(21) Appl. No.: 14/300,216

(22) Filed: Jun. 9, 2014

(65) Prior Publication Data
US 2015/0353819 A1 Dec. 10, 2015

(51) Int. Cl.
*G02F 1/15* (2006.01)
*C09K 9/02* (2006.01)

(52) U.S. Cl.
CPC .............. *C09K 9/02* (2013.01); *G02F 1/1521* (2013.01); *G02F 2001/151* (2013.01); *G02F 2001/1512* (2013.01)

(58) Field of Classification Search
CPC .............. C09K 9/02; C09K 2211/1018; C09K 2211/187; C09K 2211/14; G02F 1/1521; G02F 2001/1512; G02F 2001/1515; G02F 2001/151
USPC .......................... 252/583; 359/242, 265, 273
See application file for complete search history.

(56) References Cited

U.S. PATENT DOCUMENTS

| 6,020,987 A | 2/2000 | Baumann et al. |
| 6,509,999 B1 | 1/2003 | Shelepin et al. |
| 6,853,472 B2 | 2/2005 | Warner et al. |
| 7,106,489 B2 | 9/2006 | Berneth et al. |

(Continued)

FOREIGN PATENT DOCUMENTS

| CN | 104698717 A | 6/2015 |
| CN | 104865767 A | 8/2015 |

(Continued)

OTHER PUBLICATIONS

US 9,891,496 B2, 02/2018, Okada et al. (withdrawn)

(Continued)

*Primary Examiner* — Bijan Ahvazi
(74) *Attorney, Agent, or Firm* — Knobbe, Martens, Olson & Bear LLP

(57) ABSTRACT

Electrochromic compositions for use in devices with electrically controlled absorption of light such as light filters of variable optical density, light emission modulators, and information image displays. The described electrochromic compositions may be used, for example, for creating light-transmitting coatings of buildings for controlling indoor microclimate by regulating the flow of natural light. Specifically, described is an exemplary organic electrochromic composition that is based on biocompatible and biodegradable components and is characterized by an increased service life, a high rate of light-transmission change. The described electrochromic compositions may be prepared in a wide range of light-absorption spectra and coating colors.

8 Claims, 1 Drawing Sheet

(56) References Cited

U.S. PATENT DOCUMENTS

| | | | |
|---|---|---|---|
| 7,295,361 B2 | 11/2007 | Gavrilov et al. | |
| 7,428,091 B2 | 9/2008 | Baumann et al. | |
| 7,638,632 B2 | 12/2009 | French et al. | |
| 7,667,043 B2 | 2/2010 | Getty et al. | |
| 7,988,885 B2 | 8/2011 | Percec et al. | |
| 8,323,534 B2 | 12/2012 | Percec et al. | |
| 8,736,943 B2 | 5/2014 | Guarr et al. | |
| 8,867,116 B1 | 10/2014 | Kloeppner et al. | |
| 8,902,486 B1 | 12/2014 | Chandrasekhar | |
| 8,947,758 B2 | 2/2015 | Agrawal et al. | |
| 9,057,925 B2 | 6/2015 | Veenman et al. | |
| 9,069,222 B2 | 6/2015 | Naijo et al. | |
| 9,145,090 B2 | 9/2015 | Barksdale et al. | |
| 9,159,890 B2 | 10/2015 | Moosburger et al. | |
| 9,170,466 B2 | 10/2015 | Marcel et al. | |
| 9,207,515 B2 | 12/2015 | Chandrasekhar | |
| 9,304,368 B2 | 4/2016 | Yashiro et al. | |
| 9,440,588 B2 | 9/2016 | Nelson et al. | |
| 9,482,880 B1 | 11/2016 | Chandrasekhar et al. | |
| 9,500,888 B2 | 11/2016 | Schwartz et al. | |
| 9,500,926 B2 | 11/2016 | Fujimura et al. | |
| 9,529,240 B2 | 12/2016 | Paolini et al. | |
| 9,547,213 B2 | 1/2017 | Lee et al. | |
| 9,738,140 B2 | 8/2017 | Ash et al. | |
| 9,766,496 B2 | 9/2017 | Cammenga et al. | |
| 9,778,534 B2 | 10/2017 | Tran et al. | |
| 9,785,030 B2 | 10/2017 | Biver et al. | |
| 9,807,847 B2 | 10/2017 | Wang et al. | |
| 9,810,963 B2 | 11/2017 | Gauthier et al. | |
| 9,823,796 B2 | 11/2017 | Wang | |
| 9,829,762 B2 | 11/2017 | Takahashi et al. | |
| 9,841,652 B2 | 12/2017 | Biver et al. | |
| 9,857,656 B2 | 1/2018 | Seo et al. | |
| 9,869,918 B2 | 1/2018 | Matsumoto et al. | |
| 9,880,441 B1 | 1/2018 | Osterhout | |
| 9,891,497 B2 | 2/2018 | Yashiro et al. | |
| 9,933,680 B2 | 4/2018 | Taya et al. | |
| 9,939,703 B1 | 4/2018 | Nguyen | |
| 9,955,577 B2 | 4/2018 | Cho et al. | |
| 2002/0021481 A1 | 2/2002 | Lin et al. | |
| 2002/0051278 A1 | 5/2002 | Byker et al. | |
| 2002/0145790 A1 | 10/2002 | Berneth et al. | |
| 2004/0257633 A1 | 12/2004 | Agrawal et al. | |
| 2005/0231785 A1* | 10/2005 | Oh | B24B 37/04 359/265 |
| 2006/0007519 A1* | 1/2006 | Kanouni | C08K 5/34 359/265 |
| 2006/0050357 A1* | 3/2006 | Gavrilov | C09K 9/02 359/265 |
| 2006/0103911 A1 | 5/2006 | Baumann et al. | |
| 2009/0225393 A1 | 9/2009 | Jodicke | |
| 2009/0279160 A1 | 11/2009 | Percec et al. | |
| 2011/0147680 A1 | 6/2011 | Percec et al. | |
| 2011/0149366 A1 | 6/2011 | Percec et al. | |
| 2011/0216389 A1 | 9/2011 | Piroux et al. | |
| 2011/0222138 A1 | 9/2011 | Piroux et al. | |
| 2011/0317243 A1 | 12/2011 | Piroux et al. | |
| 2012/0242614 A1 | 9/2012 | Ferreira et al. | |
| 2014/0085913 A1* | 3/2014 | Han | B60R 1/04 362/459 |
| 2014/0198370 A1 | 7/2014 | Trajkovska-Broach et al. | |
| 2015/0077832 A1 | 3/2015 | Berland et al. | |
| 2015/0153624 A1 | 6/2015 | Yamada et al. | |
| 2015/0160525 A1 | 6/2015 | Shi | |
| 2015/0212382 A1 | 7/2015 | Miyazaki | |
| 2015/0219974 A1 | 7/2015 | Trajkovska-Broach et al. | |
| 2015/0227016 A1 | 7/2015 | Yamada et al. | |
| 2015/0261009 A1 | 9/2015 | Boulton | |
| 2015/0261056 A1 | 9/2015 | Kumar et al. | |
| 2015/0286107 A1 | 10/2015 | Chen et al. | |
| 2015/0322296 A1 | 11/2015 | Keite-Telgenbuscher et al. | |
| 2015/0338714 A1 | 11/2015 | Li | |
| 2015/0346573 A1 | 12/2015 | Theiste et al. | |
| 2015/0378396 A1 | 12/2015 | Park et al. | |
| 2016/0005375 A1 | 1/2016 | Naijo et al. | |
| 2016/0011428 A1 | 1/2016 | Li et al. | |
| 2016/0033836 A1 | 2/2016 | Chen | |
| 2016/0033839 A1 | 2/2016 | Lee et al. | |
| 2016/0033842 A1 | 2/2016 | Shi et al. | |
| 2016/0041447 A1 | 2/2016 | Yamamoto et al. | |
| 2016/0079560 A1 | 3/2016 | Guimard | |
| 2016/0167339 A1 | 6/2016 | Dollase et al. | |
| 2016/0167584 A1 | 6/2016 | Chan et al. | |
| 2016/0170277 A1 | 6/2016 | Lu et al. | |
| 2016/0203399 A1 | 7/2016 | Cox | |
| 2016/0223877 A1 | 8/2016 | Magdassi et al. | |
| 2016/0229803 A1 | 8/2016 | Lin et al. | |
| 2016/0231635 A1 | 8/2016 | Aiken et al. | |
| 2016/0243773 A1 | 8/2016 | Wang | |
| 2016/0246152 A1 | 8/2016 | Igawa et al. | |
| 2016/0259224 A1 | 9/2016 | Ozyilmaz et al. | |
| 2016/0266461 A1 | 9/2016 | Yamamoto | |
| 2016/0282978 A1 | 9/2016 | Wang | |
| 2016/0299401 A1 | 10/2016 | Kubo et al. | |
| 2016/0306251 A1 | 10/2016 | Yamamoto et al. | |
| 2017/0003562 A1 | 1/2017 | Kubo et al. | |
| 2017/0018370 A1 | 1/2017 | Segawa et al. | |
| 2017/0031224 A1 | 2/2017 | Gil et al. | |
| 2017/0031226 A1 | 2/2017 | Gauthier et al. | |
| 2017/0059957 A1 | 2/2017 | Garcia et al. | |
| 2017/0082864 A1 | 3/2017 | Zhao et al. | |
| 2017/0100991 A1 | 4/2017 | Cammenga et al. | |
| 2017/0108754 A1 | 4/2017 | Ali | |
| 2017/0114274 A1 | 4/2017 | Yamada et al. | |
| 2017/0117505 A1 | 4/2017 | Kwon | |
| 2017/0131609 A1 | 5/2017 | Okada et al. | |
| 2017/0146882 A1 | 5/2017 | Bass et al. | |
| 2017/0158139 A1 | 6/2017 | Tonar et al. | |
| 2017/0168363 A1 | 6/2017 | Kim et al. | |
| 2017/0176833 A1 | 6/2017 | Goto et al. | |
| 2017/0192334 A1 | 7/2017 | An et al. | |
| 2017/0199383 A1 | 7/2017 | Machida | |
| 2017/0219900 A1 | 8/2017 | Kim et al. | |
| 2017/0229000 A1 | 8/2017 | Law | |
| 2017/0235203 A1 | 8/2017 | Yamamoto et al. | |
| 2017/0235204 A1 | 8/2017 | Bergh et al. | |
| 2017/0239931 A1 | 8/2017 | Wolk et al. | |
| 2017/0293193 A1 | 10/2017 | Miyazaki | |
| 2017/0298682 A1 | 10/2017 | Wang et al. | |
| 2017/0307952 A1 | 10/2017 | Ash et al. | |
| 2017/0313934 A1 | 11/2017 | Yamada et al. | |
| 2017/0315384 A1 | 11/2017 | Saylor et al. | |
| 2017/0329196 A1 | 11/2017 | Timmerman et al. | |
| 2017/0329197 A1 | 11/2017 | Yashiro et al. | |
| 2017/0329199 A1 | 11/2017 | Yashiro et al. | |
| 2017/0336692 A1 | 11/2017 | Park et al. | |
| 2017/0349103 A1 | 12/2017 | Tonar et al. | |
| 2017/0351126 A1 | 12/2017 | Chu et al. | |
| 2017/0355313 A1 | 12/2017 | Park et al. | |
| 2017/0355901 A1 | 12/2017 | Branda et al. | |
| 2018/0004013 A1 | 1/2018 | Vasiliev et al. | |
| 2018/0017835 A1 | 1/2018 | Kim et al. | |
| 2018/0039148 A1 | 2/2018 | Franz et al. | |
| 2018/0066132 A1 | 3/2018 | Nair et al. | |
| 2018/0074377 A1 | 3/2018 | You et al. | |
| 2018/0088426 A1 | 3/2018 | Posset et al. | |
| 2018/0095338 A1 | 4/2018 | Ash et al. | |
| 2018/0100056 A1 | 4/2018 | Wang et al. | |
| 2018/0105738 A1 | 4/2018 | Giri | |
| 2018/0112127 A1 | 4/2018 | Franz et al. | |
| 2018/0113366 A1 | 4/2018 | Kaneko et al. | |
| 2018/0121011 A1 | 5/2018 | Vasilyev et al. | |

FOREIGN PATENT DOCUMENTS

| | | |
|---|---|---|
| CN | 106997134 A | 8/2017 |
| CN | 107779190 A | 3/2018 |
| CN | 107814493 A | 3/2018 |
| DE | 102017118091 A1 | 3/2018 |
| EP | 0725304 B1 | 4/2003 |
| EP | 3118613 A1 | 1/2017 |
| IN | 201617044949 A | 4/2017 |
| IN | 201737006673 A | 5/2017 |
| IN | 201737017732 A | 8/2017 |

(56) References Cited

FOREIGN PATENT DOCUMENTS

| KR | 1020080099660 | * | 11/2008 | ............... C09K 9/02 |
|----|---------------|---|---------|---------------------------|
| KR | 2015/007628 | | 7/2015 | |
| RU | 722219 C | | 2/1993 | |
| RU | 860456 C | | 2/1993 | |
| RU | 1334662 C | | 2/1993 | |
| RU | 972815 C | | 10/1993 | |
| RU | 2009530 C1 | | 3/1994 | |
| RU | 2052537 C1 | * | 1/1996 | ............... C23C 8/36 |
| RU | 2059974 C1 | | 5/1996 | |
| RU | 2063644 C1 | | 7/1996 | |
| RU | 2079864 C1 | | 5/1997 | |
| RU | 2110823 C1 | | 5/1998 | |
| RU | 2130630 C1 | | 5/1999 | |
| RU | 2144937 C1 | * | 1/2000 | ............... C09K 9/02 |
| RU | 2216757 C2 | | 11/2003 | |
| RU | 2224275 | | 2/2004 | |
| RU | 2321113 C1 | | 3/2008 | |
| RU | 2569913 C2 | | 12/2015 | |
| RU | 2642558 C1 | | 1/2018 | |
| SI | 0995146 | | 6/2003 | |
| SU | 566863 | | 7/1977 | |
| TW | 2015/37274 | | 4/2016 | |
| WO | WO 2014143011 A1 | | 9/2014 | |
| WO | WO 2015/040029 A2 | | 3/2015 | |
| WO | WO 2015130227 A1 | | 9/2015 | |
| WO | WO 2015163824 A1 | | 10/2015 | |
| WO | WO 2015179564 A1 | | 11/2015 | |
| WO | WO 2015/183821 A1 | | 12/2015 | |
| WO | WO 2015/193301 A1 | | 12/2015 | |
| WO | WO 2016/000996 | | 1/2016 | |
| WO | WO 2016/028828 | | 2/2016 | |
| WO | WO 2016081787 A2 | | 5/2016 | |
| WO | WO 2016/145120 A1 | | 9/2016 | |
| WO | WO 2016/209323 A1 | | 12/2016 | |
| WO | WO 2016196546 A1 | | 12/2016 | |
| WO | WO 2017094218 A1 | | 6/2017 | |
| WO | WO 2017106852 A1 | | 6/2017 | |
| WO | WO 2017109265 A1 | | 6/2017 | |
| WO | WO 2017153403 A1 | | 9/2017 | |
| WO | WO 2018007355 A1 | | 1/2018 | |
| WO | WO 2018038743 A1 | | 3/2018 | |

OTHER PUBLICATIONS

International Search Report and Written Opinion for International Application No. PCT/US2015/054335, Notification dated Feb. 2, 2016.
Alesanco, et al. "All-in-one gel-based electrochromic devices: Strengths and recent developments", *Materials*, 11, 414, 2018; 27 pages.
US 9,891,496, 06/2001, Thompson et al. (withdrawn).
Percec et al., "A Single-Layer Approach to Electrochromic Materials", Journal of Polymer Science: Part A: Polymer Chemistry, vol. 49, pp. 361-368, 2010.
A.L. Gusev, Technical Report (3-D Printer, Electrochrom), Dec. 2012, https://www.researchgate.net/publications/311562920.

* cited by examiner

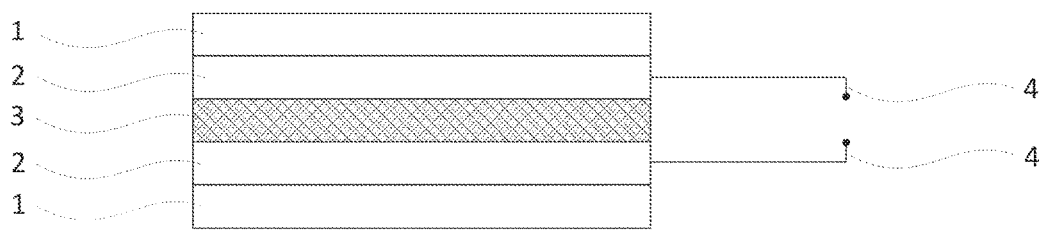

ELECTROCHROMIC COMPOSITION AND ELECTROCHROMIC DEVICE USING SAME

CROSS-REFERENCE TO RELATED PATENT APPLICATION

This U.S. patent application is related to U.S. patent application entitled "ELECTROCHROMIC DEVICE AND METHOD FOR MANUFACTURING ELECTROCHROMIC DEVICE" filed on the same day, the entire disclosure of which is incorporated by reference herein.

BACKGROUND OF THE INVENTION

Field of the Invention

The disclosed embodiments relate in general to the field of applied electrochemistry, and in particular to electrochromic compositions used in devices with electrically controlled absorption of light such as light filters of variable optical density, light emission modulators, and information image displays.

Description of the Related Art

Electrochromism is the physical phenomenon found in certain compositions of reversibly changing predetermined optical properties such as color or light transmittance with an application of an electrical voltage called a control voltage. Electrochromism provides the basis for operation of various electrochromic devices, such as smart glass well known to persons of ordinary skill in the art. Various types of optical materials and structures can be used to construct the aforesaid compounds with electrochromic properties, with the specific structures being dependent on the specific purpose of the electrochromic device.

Known in the art are electrochromic compositions based on quaternary salts of bipyridine. A composition closest to the one proposed by the present invention (i.e., the nearest prior-art composition) is a composition comprising a diperchlorate of 1,1'-dibenzyl-4,4'-dipyridine; 1,1'-diethylferrocene; a copolymer of methylmethacrylate and acrylic acid; and propylene carbonate. A major disadvantage of compositions of this type is the low rate of change in light transmittance under the effect of applied voltage, whereby problems occur in the manufacturing of coatings for use on large surface areas.

Therefore, new and improved electrochromic compositions are needed that would not be subject to the above deficiencies of the prior art technology.

SUMMARY OF THE INVENTION

The inventive methodology is directed to methods and systems that substantially obviate one or more of the above and other problems associated with conventional electrochromic compositions and electrochromic devices.

In accordance with one aspect of the embodiments described herein, there is provided an electrochromic composition comprising a cathodic component in the form of a quaternary salt of dipyridine, an anodic component in the form of a ferrocene derivative, a polymeric thickener, and a solvent, wherein the cathodic component comprises 1,1'-dialkyl-4,4'-bipyridine with anions such as BF4-, PF6-, ClO4-, CF3SO3- or (CF3SO2)2N—; the polymeric thickener comprises a copolymer of methylacrylate and an acrylic acid, polyvinyl acetate, a polylactic acid, or poly-3-hydroxybutyrate; and the solvent comprises propylene carbonate, N-methylpyrrolidone or di-, tri-polyethylene glycols or their esters; the components being used in the following mass percentage [%] quantities: 0.4-3.6 of the cathodic component in the form of 1,1'-dimethyl-4,4'-dipyridine with anions such as $BF_4$—, $PF_6$—, $ClO_4$—, $CF_3SO_3$— or $(CF_3SO_2)_2N$—; 0.3-3.0 of the anodic component in the form of 1,1'-diethylferrocene derivative; and the balance being a solvent in the form of butyrolactone or propylene carbonate or N-methylpyrrolidone or di-, tri-polyethylene glycols or their esters.

In accordance with another aspect of the embodiments described herein, there is provided an electrochromic device comprising an electrochromic composition comprising a cathodic component in the form of a quaternary salt of dipyridine, an anodic component in the form of a ferrocene derivative, a polymeric thickener, and a solvent, wherein the cathodic component comprises 1,1'-dialkyl-4,4'-bipyridine with anions such as BF4-, PF6-, ClO4-, CF3SO3- or (CF3SO2)2N—; the polymeric thickener comprises a copolymer of methylacrylate and an acrylic acid, polyvinyl acetate, a polylactic acid, or poly-3-hydroxybutyrate; and the solvent comprises propylene carbonate, N-methylpyrrolidone or di-, tri-polyethylene glycols or their esters; the components being used in the following mass percentage [%] quantities: 0.4-3.6 of the cathodic component in the form of 1,1'-dimethyl-4,4'-dipyridine with anions such as $BF_4$—, $PF_6$—, $ClO_4$—, $CF_3SO_3$— or $(CF_3SO_2)_2N$—; 0.3-3.0 of the anodic component in the form of 1,1'-diethylferrocene derivative; and the balance being a solvent in the form of butyrolactone or propylene carbonate or N-methylpyrrolidone or di-, tri-polyethylene glycols or their esters.

In accordance with yet another aspect of the embodiments described herein, there is provided a method for preparing an electrochromic composition, the method comprising: providing a cathodic component in the form of a quaternary salt of dipyridine, providing an anodic component in the form of a ferrocene derivative, providing a polymeric thickener, and providing a solvent, wherein the cathodic component comprises 1,1'-dialkyl-4, 4'-bipyridine with anions such as BF4-, PF6-, ClO4-, CF3SO3- or (CF3SO2)2N—; the polymeric thickener comprises a copolymer of methylacrylate and an acrylic acid, polyvinyl acetate, a polylactic acid, or poly-3-hydroxybutyrate; and the solvent comprises propylene carbonate, N-methylpyrrolidone or di-, tri-polyethylene glycols or their esters; the components being used in the following mass percentage [%] quantities: 0.4-3.6 of the cathodic component in the form of 1,1'-dimethyl-4,4'-dipyridine with anions such as $BF_4$—, $PF_6$—, $ClO_4$—, $CF_3SO_3$— or $(CF_3SO_2)_2N$—; 0.3-3.0 of the anodic component in the form of 1,1'-diethylferrocene derivative; and the balance being a solvent in the form of butyrolactone or propylene carbonate or N-methylpyrrolidone or di-, tri-polyethylene glycols or their esters.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary application of an embodiment of the described composition in electrochromic devices such as light-modulating devices, automotive glasses or mirrors, or windows of buildings or any other transparent or reflective surfaces.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there are provided novel electrochromic compositions for use in devices with electrically controlled (voltage-controlled) absorption of light such as light filters of variable optical density, light emission modulators, and information image displays. Various embodiments of the described electrochromic compositions may be used, for example, for creating light-transmitting coatings of buildings for controlling indoor microclimate by regulating the flow of natural light. Specifically, described is an embodiment of an organic electrochromic composition that is based on biocompatible and biodegradable components and is characterized by an increased service life as well as a high rate of light-transmittance change in response to the change in the controlled voltage. The described novel techniques enable preparing electrochromic compositions in a wide range of light-absorption spectra and coating colors.

In one or more embodiments, there is provided an electrochromic composition comprising a cathodic component such as—1,1'-dialkyl-4, 4'-bipyridine with anions of $BF_4$—, $PF_6$—, $ClO_4$—, $CF_3SO_3$— or $(CF_3SO_2)_2N$—; an anodic component such as 0.3 to 3.0% of a ferrocene derivative; an electrode reaction accelerator additive such as 0.5% of a ferrocenium salt; and a solvent such as propylene carbonate or N-methylpyrrolidone or a di-, tri-, [or another] polyethylene glycole or their ethers as the balance.

Specifically, in one exemplary embodiment, the electrochromic composition comprises a cathodic component in the form of 1,1'-dialkyl-4, 4'-bipyridine with complex fluoride anions such as $BF_4$—, $PF_6$—, and organic anions such as $CF_3SO_3$— or $(CF_3SO_2)_2N$—; an anodic component in the form of a ferrocene derivative; and a solvent such as propylene carbonate or N-methylpyrrolidone or di-, tri-, [or other] polyethylene glycols and their esters; as well as biodegradable polymers in the form of polylactic acid or poly-3-hydroxybutyrate; the components being used in the following mass percentage quantities: 0.3 to 3.2 of the cathodic component in the form of 1,1'-dimethyl-4,4'-dipyridine with anions such as $BF_4$— and $ClO_4$— or 0.5 to 4.4 of 1,1'-dibenzyl-4,4'-dipyridine with anions $BF_4$— and $ClO_4$—; 0.3 to 3.0 of the anodic component in the form of a ferrocene derivative; and the balance being a solvent. The described electrochromic composition is characterized by the replacement of used solvent and polymer thickener as well as simplification of the component composition.

In one or more embodiments, the additives comprise antioxidants including, without limitation, polyphenols, sterically hindered phenols, and/or ionol; and UV filters such as benzophenones and cinnamates.

It should be noted that modification of the described components imparts to the composition new properties, i.e., improved service life and increased rate of switching of light transmittance with application of the control voltage.

In one or more embodiments, an electrochromic device for testing of the compositions consisted of two polymer films coated on their inner sides with semiconductor coatings of $In_2O_3$ films with doping additives or films coated with current-conductive metal meshes. The distance between the films in the device was determined by the thickness of the inert filler introduced into the electrochromic composition for maintaining a constant thickness of the electrochromic layer. The electrochromic composition was introduced between the films, and then both films were bonded to one another over the perimeter.

Certain specific examples of the application of the described electrochromic composition will now be described.

Example 1

A first exemplary composition was prepared by dissolving 1,1'-dibenzyl-4,4'-bipyridinium di(perchlorate) to a concentration of 1.2% and 1,1'-diethylferrocene, as well as a copolymer of methylacrylate and acrylic acid to a concentration of 33.8% in propylene carbonate. The resulting composition was used for constructing an electrochromic device having the thickness of the inter-electrode spacing being 100 μm. In the initial state, the composition had a light yellowish color. When voltage of 1.5 V was applied, the color turned blue. Initial transmittance was 70%. The electrochromic device was tested for 8 hours per day under the following conditions: coloring for 30 seconds at U=1.5 V and discoloration for 30 seconds by circuiting the electrodes. After 3 and 6 months of work in a non-colored state, the light transmittance was 65% and 61%, respectively.

Example 2

A second exemplary composition was prepared by dissolving 1,1'-dibenzyl-4,4'-bipyridinium di(perchlorate) to concentration of 1.2%, 1,1'-diethylferrocene to a concentration of 0.5%, and a copolymer of methylacrylate and acrylic acid to a concentration of 33.8% in propylene carbonate. The resulting composition was used for filling a 50-μm interelectrode space of the electrochromic device. In the initial state, the composition was practically colorless. When voltage of 1.5 V was applied, the color turned blue. Initial transmittance was 78%. The electrochromic device was tested for 8 hours per day under the following conditions: coloring for 30 seconds at U=1.5 V and discoloration for 30 seconds by circuiting the electrodes. After 3 and 6 months of work in a noncolored state, transmittance was 75% and 69%, respectively.

Example 3

A third exemplary composition was prepared by dissolving 1,1'-dibenzyl-4,4'-bipyridinium di(perchlorate) to a concentration of 1.2%, 1,1'-diethylferrocene to a concentration of 0.5%, and polyvinyl acetate to a concentration of 34% in propylene carbonate. The resulting composition was used for filling a 50-μm interelectrode space of an electrochromic device. In the initial state, the composition was practically colorless. When voltage of 1.5 V was applied, the color turned blue. Initial transmittance was 77%. The electrochromic device was tested for 8 hours per day under the following conditions: coloring for 30 seconds at U=1.5 V and discoloration for 30 seconds by circuiting the electrodes. After 3 and 6 months of work in a noncolored state, transmittance was 73% and 65%, respectively.

In one or more embodiments, the upper limit of concentrations was determined by solubility of quaternary salts of bipyridine in the solvent used, and the lower limit was defined by the minimal value of light absorption in an electrically colored state at which it became unsuitable for practical use. Furthermore, the proposed composition comprises an additive that accelerates electrode reaction and thus shortens switching time of the device.

The embodiments of the electrochromic composition described herein have a prolonged service life, during which the main optical light characteristic, i.e., light transmittance, is preserved.

FIG. 1 illustrates an exemplary application of an embodiment of the described composition in electrochromic devices such as light-modulating devices, automotive glasses or mirrors, or windows of buildings or any other transparent or reflective surfaces.

In the exemplary embodiment illustrated in FIG. 1, the described electrochromic composition (3) is embodied as a layer (3) of an arbitrary thickness located between two transparent conductive layers (2). The thickness of the electrochromic layer is defined by the specific use and may range from 25 μm to 200 μm. Transparent conductive layers (2) are arranged on a substrate (1), which functions as a protective and fixing layer. Control voltage is supplied to the transparent electrically conductive layers (4) by lead wires or loops.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in electrochromic compositions for use in devices with electrically controlled absorption of light. It is intended that the specification and examples be considered as exemplary only, with a true scope and spirit of the invention being indicated by the following claims.

What is claimed is:

1. An electrochromic composition comprising:
   a solvent comprising one of propylene carbonate, N-methylpyrrolidone, polyethylene glycol, or an ester thereof;
   a cathodic component in the form of a quaternary salt of dipyridine, the cathodic component comprising:
   a quaternary salt comprising one of 1,1'-dimethyl-4,4'-dipyridinium, 1,1'-diethyl-4,4'-dipyridinium or 1,1'-dibenzyl-4,4'-dipyridinium and one of $CF_3SO_3^-$ or $(CF_3SO_2)_2N^-$, the quaternary salt being present at a concentration of 0.4-0.3.6 mass % on the basis of a total mass of the electrochromic composition, and
   a balance comprising the solvent;
   an anodic component in the form of a ferrocene derivative, the anodic component comprising:
   ferrocene or 1,1'-diethylferrocene at a concentration of 0.3-3.0 mass %, on the basis of a total mass of the electrochromic composition, and
   a balance comprising the solvent;
   a polymeric thickener comprising a copolymer of methylacrylate and one of a polylactic acid or poly-3-hydroxybutyrate
   at least one antioxidant comprising ionol; and
   an ultraviolet filter comprising a cinnamate.

2. The electrochromic composition of claim 1, wherein the at least one antioxidant comprises a polyphenol.

3. The electrochromic composition of claim 1, wherein the at least one antioxidant comprises a sterically hindered phenol.

4. The electrochromic composition of claim 1, wherein the ultraviolet filter comprises a benzophenone.

5. An electrochromic device comprising an electrochromic composition, the electrochromic composition comprising:
   a solvent comprising one of propylene carbonate, N-methylpyrrolidone, polyethylene glycol, or an ester thereof;
   a cathodic component in the form of a quaternary salt of dipyridine, the cathodic component comprising:
   a quaternary salt comprising one of 1,1'-dimethyl-4,4'-dipyridinium, 1,1'-diethyl-4,4'-dipyridinium or 1,1'-dibenzyl-4,4'-dipyridinium and one of $CF_3SO_3^-$ or $(CF_3SO_2)_2N^-$, the quaternary salt being present at a concentration of 0.4-3.6 mass % on the basis of a total mass of the electrochromic composition, and
   a balance comprising the solvent;
   an anodic component in the form of a ferrocene derivative, the anodic component comprising:
   ferrocene or 1,1'-diethylferrocene, at a concentration of 0.3-3.0 mass % on the basis of a total mass of the electrochromic composition, and
   a balance comprising the solvent;
   a polymeric thickener comprising a copolymer of methylacrylate and one of a polylactic acid or poly-3-hydroxybutyrate
   at least one antioxidant comprising ionol; and
   an ultraviolet filter comprising a cinnamate.

6. The electrochromic device of claim 5, wherein the at least one antioxidant comprises a polyphenol.

7. The electrochromic device of claim 5, wherein the at least one antioxidant comprises a sterically hindered phenol.

8. The electrochromic device of claim 5, wherein the ultraviolet filter comprises a benzophenone.

* * * * *